(12) United States Patent
Liu et al.

(10) Patent No.: US 10,961,687 B2
(45) Date of Patent: Mar. 30, 2021

(54) SILT FILTERING DEVICE

(71) Applicant: Xiaojun Liu, Shenzhen (CN)

(72) Inventors: Xiaojun Liu, Shenzhen (CN); Caixia Wang, Shenzhen (CN); Junlong Liu, Shenzhen (CN)

(73) Assignee: Xiaojun Liu, Shenzhen (CN)

( * ) Notice: Subject to any disclaimer, the term of this patent is extended or adjusted under 35 U.S.C. 154(b) by 273 days.

(21) Appl. No.: 16/124,216

(22) Filed: Sep. 7, 2018

(65) Prior Publication Data

US 2019/0242091 A1    Aug. 8, 2019

(30) Foreign Application Priority Data

Feb. 8, 2018 (CN) .......................... 201810130796.0

(51) Int. Cl.
| | | |
|---|---|---|
| *E02F 5/28* | (2006.01) | |
| *E02F 3/94* | (2006.01) | |
| *E02F 3/88* | (2006.01) | |
| *E02F 3/90* | (2006.01) | |

(52) U.S. Cl.
CPC .............. *E02F 5/28* (2013.01); *E02F 3/8816* (2013.01); *E02F 3/907* (2013.01); *E02F 3/945* (2013.01)

(58) Field of Classification Search
CPC . E02F 5/28; E02F 3/8816; E02F 3/907; E02F 3/945
See application file for complete search history.

(56) References Cited

U.S. PATENT DOCUMENTS

2010/0095559 A1*    4/2010   Buckner ................. E02F 3/925
                                                             37/304

* cited by examiner

*Primary Examiner* — Jonathan M Peo

(57) ABSTRACT

A silt filtering device includes a moving bottom plate. A first material conveying water pump, a stirring box, a filter box and a compression box are sequentially arranged on an upper portion of the moving bottom plate. A roller mechanism is arranged on each of four diagonal portions of a lower portion of the moving bottom plate. A controller, an infrared sensor and a high-definition camera assembly are arranged on the upper portion of the moving bottom plate. The first material conveying water pump conveys silt material to the stirring box through a convey pipe. A jitter mechanism assembly is arranged at a bottom portion of the stirring box to generate jittering. The jitter mechanism assembly comprises a plurality of identically shaking spring bodies and a driving cylinder arranged on the shaking spring bodies.

6 Claims, 2 Drawing Sheets

US 10,961,687 B2

SILT FILTERING DEVICE

BACKGROUND

Field

The present disclosure relates to the technical field of silt filtering devices, and more particularly to a silt filtering device capable of having reasonable structural design, good use effect, convenient control, and effectively improving silt treatment quality.

Description of Prior Art

In water conserving projects, there are different degrees of silt and sludge accumulation situation. If the sediment or silt is not cleaned regularly, it will easily lead to blockage of waterways and rivers, which greatly affects water conservation facilities. In order to clean up the sediment and the silt, some methods directly used manual excavation, but these methods are not only time-consuming and labor-intensive, but they also easily affect the ecology of the river. Some methods also use a corresponding silt discharging device or dredging device for cleaning. However, due to the limitations of the prior structure and design of silt discharging devices, they are often unable to filter muddy water and mixed impurities in the silt during the process of extracting the silt, thereby greatly reducing the silt treatment quality and affecting performance of the silt discharging device.

SUMMARY

In order to overcome the problems existing in the prior art, the present disclosure provides a silt filtering device with reasonable structural design, good use effect and convenient control, and is able to effectively improve the quality of silt treatment.

Compared with the prior art, the present disclosure of the silt filtering device comprises a moving bottom plate. A first material conveying water pump, a stirring box, a filter box and a compression box are sequentially arranged on an upper portion of the moving bottom plate. And a roller mechanism is arranged on each of four diagonal portions of a lower portion of the moving bottom palate. The first material conveying water pump conveys silt material to the stirring box through a convey pipe. A jitter mechanism assembly is arranged at a bottom portion of the stirring box to generate the jittering. The jitter mechanism assembly comprises a plurality of identically shaking spring bodies and a driving cylinder arranged on the shaking spring bodies. In the course of practical use, the stirring box is able to effectively stir silt impurities, the filter box is able to effectively filter silt, and the compression box filters the liquid when the liquid is compressed. Structure of the present disclosure is reasonable in design and good in use, and is suitable for wide-scale promotion.

DETAILED DESCRIPTION OF PREFERRED EMBODIMENTS

To make the objects, technical proposals and merits of the present disclosure more apparent, the present disclosure will be further described in detail with reference to the drawings and embodiments. It should be understood that the embodiments described here are only used to illustrate the present disclosure and are not intended to limit the present disclosure.

Figure 1:
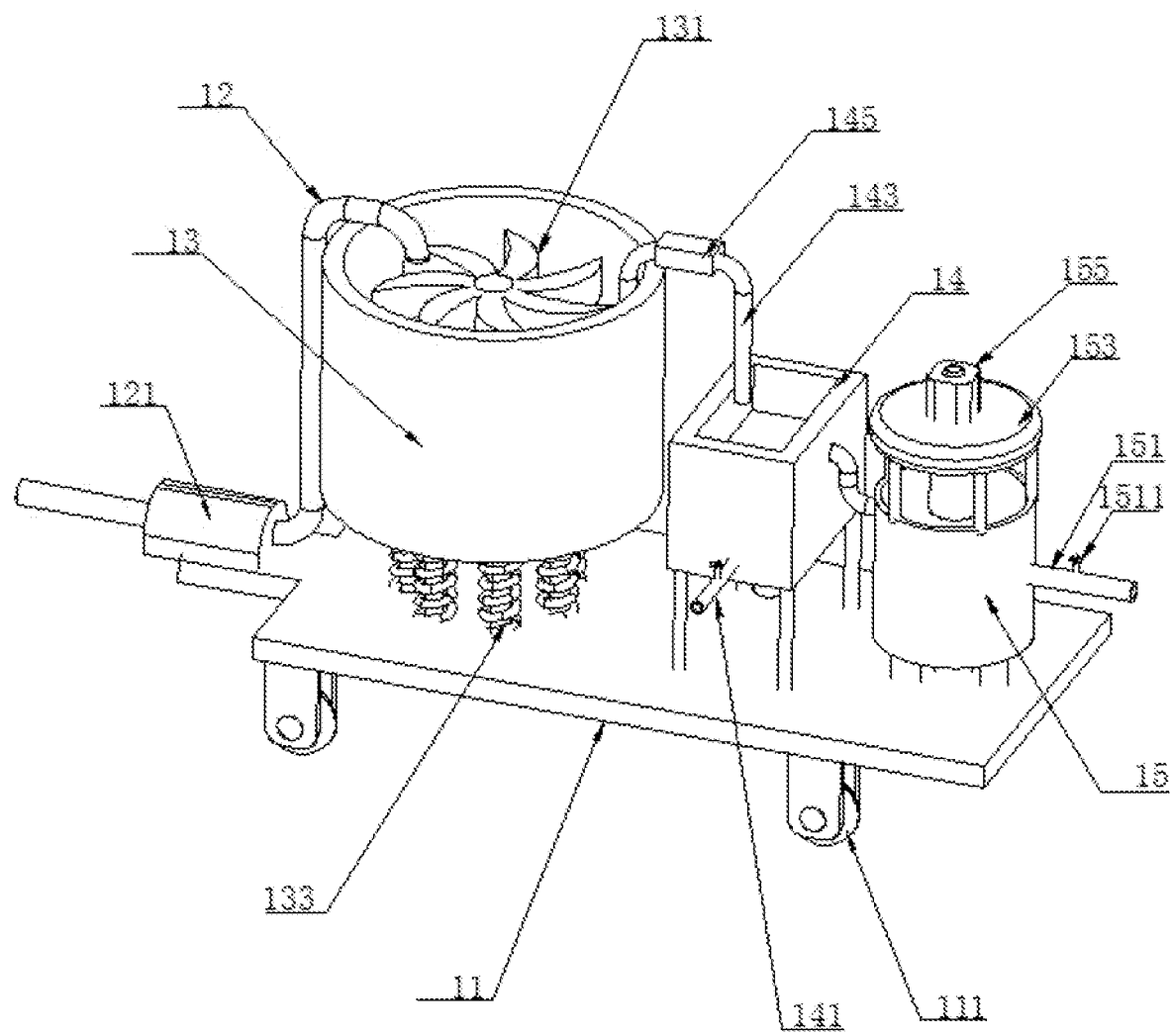
FIG. 1 is a perspective view showing a structural diagram of a silt filtering device of the present disclosure.
Figure 2:
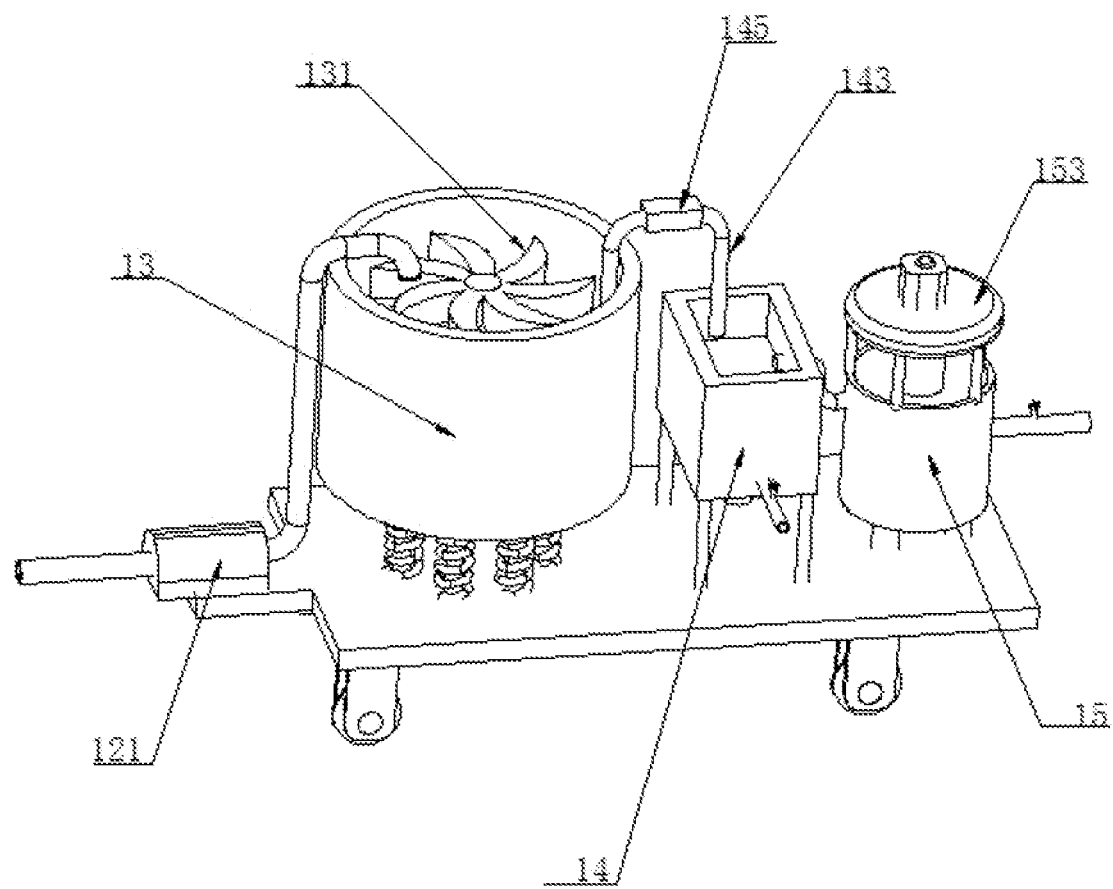
FIG. 2 is another perspective view showing the structural diagram of the silt filtering device of the present disclosure.

As shown in FIG. 1 and FIG. 2, the present disclosure provides a silt filtering device 1 for effectively improving silt treatment quality. The silt filtering device 1 comprises a moving bottom plate 11. A first material conveying water pump 121, a stirring box 13, a filter box 14 and a compression box 15 are sequentially arranged on an upper portion of the moving bottom plate 11. A roller mechanism 111 is arranged on each of four diagonal portions of a lower portion of the moving bottom palate 11. A controller, an infrared sensor, and a high-definition camera assembly are arranged on the upper portion of the moving bottom plate 11. The first material conveying water pump 121 conveys silt material to the stirring box 13 through a convey pipe 12. A rotating shaft, a plurality of blades 131 connected with the rotating shaft, and a first driving motor used to drive the rotating shaft to rotate are arranged in the stirring box 13. An aeration mechanism assembly is arranged at a bottom portion of the stirring box 13. The controller is electrically connected with the first material conveying water pump, the infrared sensor, the high-definition camera assembly, the first driving motor, and the aeration mechanism assembly. A jitter mechanism assembly 133 is arranged at the bottom portion of the stirring box 13 to generate jittering. The jitter mechanism assembly 133 comprises a plurality of identically shaking spring bodies and a driving cylinder arranged on the shaking spring bodies. The shaking spring bodies are arranged at the bottom portion of the stirring box 13 and form an annular matrix. The stirring box 13 is connected with the filter box 14 through a first intermediate pipe 143. A second water pump 145 is arranged in the first intermediate pipe 143. The filter box 14 is a cube structure. A plurality of filter plates and polyvinyl chloride (PVC) filter layers are arranged inside the filter box 14 from top to bottom. The filter plates comprise an activated carbon filter plate, a quartz sand filter plate, a sponge filter plate, and an anthracite filter plate. Thicknesses of the activated carbon filter plate, the quartz sand filter plate, the sponge filter plate, and the anthracite filter plate sequentially increase. The thickness of the activated carbon filter plate ranges from 2.3 cm to 3.5 cm. The thickness of the quartz sand filter plate ranges from 4.6 cm to 5.5 cm. The thickness of the sponge filter plate ranges from 6.5 cm to 7.5 cm. The thickness of the anthracite filter plate ranges from 8.2 cm to 8.5 cm. A bottom portion of the filter box 14 is connected with a first drainage pipe 141. An electromagnetic control valve is arranged in the first drainage pipe 141. The filter box 14 is connected with the compression box 15 through a second intermediate pipe. Fluid silt on an upper portion of the filter plates are conveyed to the compression box 15 through the second intermediate pipe. The compression box 15 comprises a compression box main body and a compression cylinder 155 arranged on an upper portion of the compression box main body. The compression box 15 further comprises a mounting plate 153 arranged on the upper portion of the compression box main body through a plurality of support columns, and the mounting plate 153 is used to load the compression cylinder 155. A driving shaft of the compression cylinder 155 is connected with a compression plate. A plurality of through-holes are arranged on the compression plate. An aperture of each through-hole ranges from 2 mm to 5 mm. A surge bin used to store silt materials from the filter box 14 is arranged inside the compression box main body. The compression cylinder 155 drives the compression plate to perform an up and down compression piston movement in the surge bin. A second drainage pipe 151 is connected with a lower portion of the compression box 15. An electromagnetic control valve 1511 is arranged in the second drainage pipe 151, The driving cylinder, the electromagnetic control v and the compression cylinder 155 are electrically connected with the controller. A second driving motor is arranged on each of the four roller mechanisms of the lower portion of the moving bottom plate 11 and the second driving motor is used to drive the roller mechanism. The second driving motor is electrically connected with the controller.

The present disclosure comprises the moving bottom plate 11. The first material conveying water pump 121; the stirring box 13, the filter box 14 and the compression box 15 are sequentially arranged on the upper portion of the moving bottom plate 11. And the roller mechanism 111 is arranged on each of four diagonal portions of the lower portion of the moving bottom palate 11. The first material conveying water pump 121 conveys silt material to the stirring box 13 through the convey pipe 12. The jitter mechanism assembly is arranged at the bottom portion of the stirring box 13 to generate jittering. The jitter mechanism assembly comprises a plurality of identically shaking spring bodies and a driving cylinder arranged on the shaking spring bodies. In the course of practical use, the stirring box 13 is able to effectively stir silt impurities, the filter box 14 is able to effectively filter silt, and the compression box 15 filters the liquid when the liquid is compressed. Structure of the present disclosure is reasonable in design and good in use, and is suitable for wide-scale promotion.

Furthermore, a wireless communication transmission unit is arranged inside the controller and is in communication connection with an external mobile terminal.

Furthermore, a silt concentration sensor, a liquid level sensor, and a temperature sensor are arranged inside the stirring box; the controller is electrically connected with the silt concentration sensor, the liquid level sensor and the temperature sensor.

Furthermore, a touch display screen and a plurality of control buttons are arranged on an exterior of the controller.

Furthermore, a plurality of signal indicator lights are arranged around the moving bottom plate 11.

Furthermore, the touch display screen is a capacitive touch display screen.

Compared with the prior art, the present disclosure of the silt filtering device 1 comprises the moving bottom plate 11, The first material conveying water pump 121; the stirring box 13, the filter box 14 and the compression box 15 are sequentially arranged on the upper portion of the moving bottom plate 11. And the roller mechanism 111 is arranged on each of four diagonal portions of the lower portion of the moving bottom palate 11. The first material conveying water pump 121 conveys silt material to the stirring box 13 through the convey pipe 12. The jitter mechanism assembly is arranged at the bottom portion of the stirring box 13 to generate jittering. The jitter mechanism assembly comprises a plurality of identically shaking spring bodies and a driving cylinder arranged on the shaking spring bodies. In the course of practical use, the stirring box 13 is able to effectively stir silt impurities, the filter box 14 is able to effectively filter silt, and the compression box 15 filters the liquid when the liquid is compressed. Structure of the present disclosure is reasonable in design and good in use, and is suitable for wide-scale promotion.

The above-described embodiments of the present disclosure are not to be construed as limiting the scope of the present disclosure. Any of the modifications, equivalent replacement, and improvement within the spirit and principle of the present disclosure should fall within the protection scope of the claims.

What is claimed is:

1. A silt filtering device, comprising
a moving bottom plate;
wherein a first material conveying water pump, a stirring box, a filter box for filtering silt and a compression box are sequentially arranged on an upper portion of the moving bottom plate, a roller mechanism is arranged on each of four diagonal portions of a lower portion of the moving bottom plate;
wherein a controller, an infrared sensor, and a high-definition camera assembly are arranged on the upper portion of the moving bottom plate; the first material conveying water pump conveys the silt to the stirring box through a convey pipe; a rotating shaft, a plurality of blades connected with the rotating shaft and a first driving motor driving the rotating shaft to rotate are arranged in the stirring box; an aeration mechanism assembly is arranged at a bottom portion of the stirring box; the controller is electrically connected with the first material conveying water pump, the infrared sensor, the high-definition camera assembly, the first driving motor and the aeration mechanism assembly; a jitter mechanism assembly is arranged at the bottom portion of the stirring box to generate jittering;
wherein the jitter mechanism assembly comprises a plurality of identically shaking spring bodies and a driving cylinder arranged on the shaking spring bodies; the shaking spring bodies are arranged at the bottom portion of the stirring box and form an annular matrix; the stirring box is connected with the filter box through a first intermediate pipe; and a second water pump is arranged in the first intermediate pipe;
wherein the filter box is a cube structure, and a plurality of filter plates and polyvinyl chloride (PVC) filter layers are arranged inside the filter box from top to bottom; the filter plates comprise an activated carbon filter plate, a quartz sand filter plate, a sponge filter plate and an anthracite filter plate; thicknesses of the activated carbon filter plate, the quartz sand filter plate, the sponge filter plate and the anthracite filter plate sequentially increase; the thickness of the activated carbon filter plate ranges from 2.3 cm to 3.5 cm; the thickness of the quartz sand filter plate ranges from 4.6 cm to 5.5 cm; the thickness of the sponge filter plate ranges from 6.5 cm to 7.5 cm; the thickness of the anthracite filter plate ranges from 8.2 cm to 8.5 cm;
wherein a bottom portion of the filter box is connected with a first drainage pipe; an electromagnetic control valve is arranged in the first drainage pipe; the filter box is connected with the compression box through a second intermediate pipe; fluid silt on an upper portion of the filter plates is conveyed to the compression box through the second intermediate pipe; the compression box comprises a compression box main body and a compression cylinder arranged on an upper portion of the compression box main body and the compression box further comprises a mounting plate arranged on the upper portion of the compression box main body through a plurality of support columns, and the mounting plate loads the compression cylinder; a driving shaft of the compression cylinder is connected with a compression plate and a plurality of through-holes are arranged on the compression plate; an aperture of each through-hole ranges from 2 mm to 5 mm; a surge bin used to store silt materials from the filter box is arranged inside the compression box main body; the compression cylinder drives the compression plate to perform a up and down compression piston movement in the surge bin; a second drainage pipe is connected with a lower portion of the compression box, an electromagnetic control valve is arranged in the second drainage pipe; the driving cylinder, the electromagnetic control valves, and the compression cylinder are electrically connected with the controller; a second driving motor is arranged on each of the four roller mechanisms of the lower portion of the moving bottom plate and the second driving motor drives the roller mechanism; and the second driving motor is electrically connected with the controller.

2. The silt filtering device according to claim 1, wherein a wireless communication transmission unit is arranged inside the controller and is in communication connection with an external mobile terminal.

3. The silt filtering device according to claim 1, wherein a silt concentration sensor, a liquid level sensor, and a temperature sensor are arranged inside the stirring box; the controller is electrically connected with the silt concentration sensor, the liquid level sensor and the temperature sensor.

4. The silt filtering device according to claim 3, wherein a touch display screen and a plurality of control buttons are arranged on an exterior of the controller.

5. The silt filtering device according to claim 1, wherein a plurality of signal indicator lights are arranged around the moving bottom plate.

6. The silt filtering device according to claim 4, wherein the touch display screen is a capacitive touch display screen.

* * * * *